June 17, 1941.   R. W. BROWN   2,245,753
FUEL DISPENSING NOZZLE
Filed Sept. 4, 1940
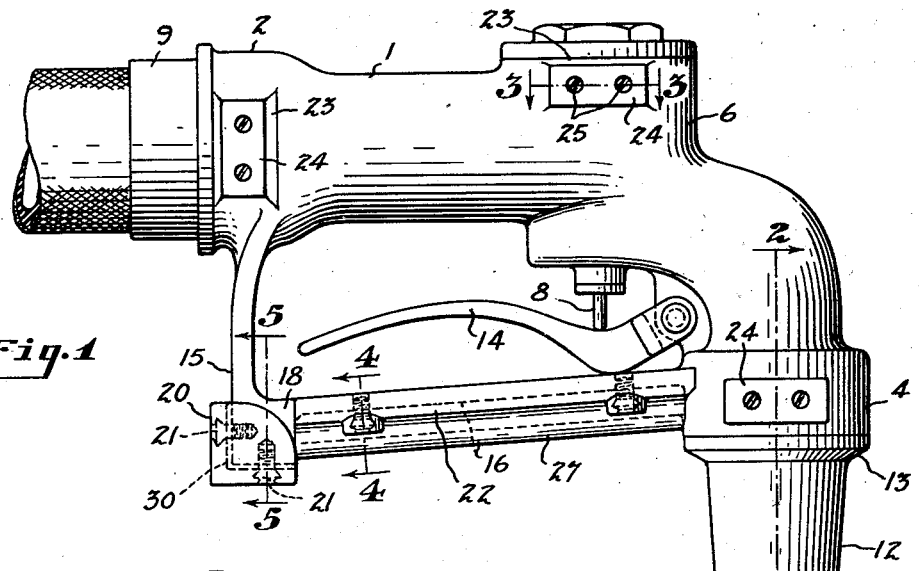
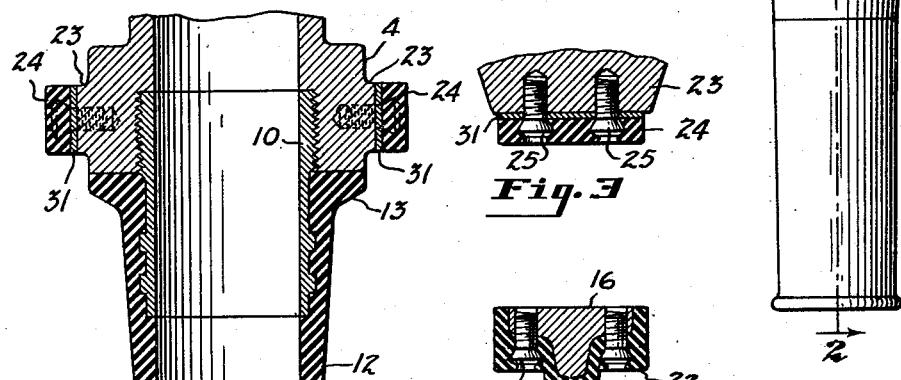
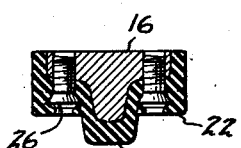
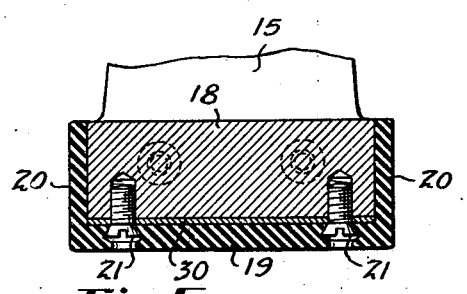
INVENTOR
Ray W. Brown
BY Evans + McCoy
ATTORNEYS Patented June 17, 1941

2,245,753

UNITED STATES PATENT OFFICE 2,245,753

FUEL DISPENSING NOZZLE

Ray W. Brown, Akron, Ohio, assignor to The General Tire & Rubber Company, Akron, Ohio, a corporation of Ohio Application September 4, 1940, Serial No. 355,341

3 Claims. (Cl. 221—84)

This invention relates to improvements in nozzles for dispensing gasoline and other fluids. It particularly relates to nozzles which are adapted for filling airplane fuel tanks and the like and which will not permit metal-to-metal contact with vehicles.

Automobiles, airplanes and the like, being insulated from the ground by rubber tires, etc., develop substantial charges of static electricity. If in the refueling of such vehicles the metallic portions of the nozzle are permitted to come in contact with the tank, a discharge of static electricity is likely to take place between the metal nozzle and the tank. It has been recommended to ground the nozzle so as to prevent the generation of static electricity by the flow of gasoline. Such grounding of the nozzle increases the protection from static generated by the flow of fluid, but increases the tendency for a spark discharge of any static electricity initially on the vehicle.

It has been proposed to mold the end portion of the nozzle from a halogen containing synthetic rubber, which is said to reduce the tendency for generating electricity. Such nozzles, however, have a metal portion which may make metallic contact with the tank or the vehicle, and such contact is likely to cause a dangerous spark discharge to occur, as well as to cause scratching of the finish of the vehicle.

It is an object of the present invention to provide a nozzle for dispensing inflammable fluids which has a non-conductive end portion to be inserted into the opening in the tank of the vehicle and which has non-conductive bumpers of soft rubber-like material disposed at points where metal-to-metal contact is likely to occur.

It is another object of the present invention to provide a nozzle having bumpers of relatively soft rubber-like material disposed about the metal portion of the nozzle at points where contact with the finish of the vehicle is likely to occur so that scratching is avoided even if the nozzle is dropped.

Other objects will be apparent from the following description of the invention, illustrated by the accompanying drawing, in which:

Figure 1 is a side elevational view of my improved nozzle;

Fig. 2 is a vertical sectional view through a portion of the nozzle on the line 2—2 of Fig. 1;

Fig. 3 is a transverse sectional view on the line 3—3 of Fig. 1;

Fig. 4 is a sectional view on the line 4—4 of Fig. 1; and

Fig. 5 is a sectional view through a portion of the nozzle on the line 5—5 of Fig. 1.

Referring more particularly to the drawing, wherein like parts are designated by like numerals of reference throughout the several views, my improved nozzle has a body portion 1 comprising an enlarged inlet portion 2 having a suitable inlet therein, a curved outlet portion 4 with a threaded outlet therein, and a valve housing 6 which has a valve controlled passageway which connects with the inlet and the outlet. The passageway in the inlet portion 2 is preferredly substantially at right angles to the passageway in the outlet portion 4.

The inlet portion 2 is threaded or otherwise adapted to receive a hose connection 9 and the outlet portion 4 is threaded or otherwise adapted to receive a suitable nipple 10 which is integrally molded into the nozzle portion 12. The nozzle portion 12 is formed of an oil-resistant rubber-like material, such as one of the oil-resistant synthetic rubbers, and has a collar 13 disposed around its base at the juncture with said metallic body portion.

A valve control lever 14 is pivotally carried by the body member and is adapted to be moved toward the body member 1 and operate the stem 8 to open the valve so as to permit fluid to flow through said passageway. A guard, having a leg 15 which is disposed generally perpendicular to the passageway in the inlet 2 and a leg 16 which is generally parallel to the passageway in the inlet portion 2, extends between said inlet and outlet portions and cooperates with the body portion in surrounding the control lever 14 so that said control lever will not be moved so as to open the valve when the nozzle is inadvertently pressed against a support.

A bumper block 18 is preferably disposed at the juncture of the legs 15 and 16 of the guard. An angular rubber bumper pad 19, preferably having protective end portions 20 and an angular metal liner 30 which is attached to the rubber by rubber-to-metal adhesion, is disposed over the outer surface of the bumper block and is preferably fastened thereto by suitable means such as the screws 21.

Means such as the pads 23 with bumpers 24 of soft rubber-like material attached thereto, are provided for preventing contact between the body member and a plane surface when the nozzle is laid or falls thereon. The bumpers 24 are attached to the pads 23 by suitable means such as recessed or concealed screws 25, and are disposed at suitable points such as on opposite sides of the outer surface of the inlet portion 2, the valve housing portion 6, and the outlet portion 4. The bumpers are attached by adhesion to a metal backing member 31 and preferably placed so that they cover the portions of the body which are at greatest distance above and below a plane passing longitudinally through the guard and symmetrically dividing said body.

A protective layer 22 of rubber-like material is disposed over the outer surface of the leg 16. The protective layer 22, which is attached to the leg 16 by suitable means such as the recessed screws 26, preferably has a longitudinal rib 27 disposed centrally thereof.

It will be seen that the nozzles of the present invention have relatively non-conductive rubber disposed about all portions of the nozzle where contact with the metal or finish of the vehicles is likely to occur. The danger from static discharge and fire, as well as danger to the finish, is thereby substantially eliminated.

It will be understood that modifications of the construction shown may be resorted to without departing from the spirit of this invention as defined in the appended claims.

What I claim is:

1. A dispensing nozzle for gasoline and the like, comprising a metal body portion with an inlet and outlet adapted to receive a hose connection and a nozzle portion, respectively, a valve housing portion having a valve controlled passageway for the passage of fluid between said inlet and outlet, a valve actuating lever pivotally carried by said body portion, a guard carried by said body portion and protecting said lever, said guard having one leg disposed generally perpendicular to the passageway at said inlet and joining said body portion adjacent said inlet, and another leg with protective cushioning layer of rubber-like material on its outer surface, disposed generally perpendicular to the passageway at said outlet and joining said body portion adjacent said outlet, an angular bumper pad of rubber-like material covering the outer surface of said guard at the juncture of said legs, a nozzle portion of rubber-like material attached in said outlet, bumpers of rubber-like material mounted on the sides of said body portion adjacent said inlet and said outlet to prevent contact being made between the metal of the body portion and a plane surface.

2. A dispensing nozzle for gasoline and the like, comprising a metal body portion with an inlet and outlet adapted to receive a hose connection and a nozzle portion, respectively, a valve housing portion having a valve controlled passageway for the passage of fluid between said inlet and outlet, a valve actuating lever pivotally carried by said body portion, a guard carried by said body portion and protecting said lever, said guard having one leg disposed generally perpendicular to the passageway at said inlet and joining said body portion adjacent said inlet, and another leg with a protective cushioning layer of rubber-like material on its outer surface, disposed generally perpendicular to the passageway at said outlet and joining said body portion adjacent said outlet, a bumper block disposed at a juncture of the legs of said guard, an annular bumper of rubber-like material carried by said bumper block and covering the outer surface thereof, a nozzle portion of rubber-like material having a metal nipple integrally molded therein attached in said outlet, pads disposed on the sides of said body portion adjacent said inlet and said outlet, bumpers of rubber-like material mounted on said pads, said bumpers preventing contact being made between the metal of the body portion and a plane surface.

3. A dispensing nozzle for gasoline and the like, comprising a metal body portion with an inlet and outlet adapted to receive a hose connection and a nozzle portion, respectively, a valve housing portion having a valve controlled passageway for the passage of fluid between said inlet and outlet, a valve actuating lever pivotally carried by said body portion, a guard carried by said body portion and protecting said lever, said guard having one leg disposed generally perpendicular to the passageway at said inlet and joining said body portion adjacent said inlet, and another leg with a protective cushioning layer of rubber-like material on its outer surface, disposed generally perpendicular to the passageway at said outlet and joining said body portion adjacent said outlet, a bumper block disposed at a juncture of the legs of said guard, an annular bumper of rubber-like material carried by said bumper block and covering the outer surface thereof, a nozzle portion of rubber-like material having a metal nipple integrally molded therein attached in said outlet, pads disposed on the sides of said body portion adjacent said inlet and said outlet on said valve housing, bumpers of rubber-like material attached to said pads, said bumpers preventing contact being made between the metal of said body portion and a plane surface.

RAY W. BROWN.